United States Patent [19]

Anderson et al.

[11] Patent Number: 4,706,521
[45] Date of Patent: Nov. 17, 1987

[54] BELLOWS ACTIVATED UNDERDRIVE TWO SPEED ACCESSORY DRIVE

[75] Inventors: Andrew G. Anderson, London; Leigh A. Shoji, Chatham, both of Canada

[73] Assignee: Bendix Electronics Limited, Chatham, Canada

[21] Appl. No.: 892,536

[22] Filed: Jul. 31, 1986

[51] Int. Cl.$^4$ .................. F16H 3/44; F16H 57/10
[52] U.S. Cl. ..................... 74/785; 192/88 A
[58] Field of Search ............. 74/785; 192/88 A, 85 A

[56] References Cited

U.S. PATENT DOCUMENTS 2,661,696  12/1953  Dale .................................. 192/88 A
2,890,776  6/1959   Aschauer ........................ 192/88 A X
3,527,329  9/1970   Jordan ............................. 192/88 A

FOREIGN PATENT DOCUMENTS 14450  of 1905  United Kingdom .................. 74/785
17606  of 1909  United Kingdom .................. 74/785

*Primary Examiner*—Dirk Wright
*Attorney, Agent, or Firm*—Markell Seitzman; Russel C. Wells

[57] ABSTRACT

A drive (10) having high speed and low speed modes of operation comprising an input shaft (20), a planetary gear set (12) drivingly connected to the input shaft (20) comprising a sun gear (14) disposed about the input shaft, a brake (46) for preventing the ring gear from rotating during the low speed mode; an output pulley (50) linked to and rotatably with the planetary gear set (12), a clutch (60) for connecting the output pulley (50) to the input shaft (20) during the high speed mode and for disengaging the output pulley from the input shaft during the low speed mode, and bellows (90) for moving the clutch (60) into and out from engagement during the high and low speed modes.

8 Claims, 2 Drawing Figures

BELLOWS ACTIVATED UNDERDRIVE TWO SPEED ACCESSORY DRIVE

BACKGROUND AND SUMMARY OF THE INVENTION

The present invention relates to a clutching device generally and more specifically to an engine driven apparatus for controllably rotating at least one vehicle mounted accessory at either one of two preselected speed ratios.

The present invention incorporates therein a planetary gear set which is often found in devices of this type used for speed changing applications. The speed changing application is selectively performed by restraining one of either the ring gear, the sun gear, or the planetary gear carrier of the planetary gear set. Cooperating with the planetary gear set is an actuator. Representative of these actuators used in the prior art are electromagnetic clutches or mechanical clutches driven by linear actuators, such as a ball ramp actuator. The electromagnetic clutch often finds use in low torque transmission applications. The ball ramp is used in higher torque transmissions and is susceptible to misalignment, which may result in a reduced life of the drive.

It is an object of this invention to provide a bellows activated underdrive two speed accessory drive that is capable of operating vehicle accessories at full speed or at reduced speed. An advantage of one embodiment of the invention is that the use of thrust bearings is eliminated and plate clutches may be substituted for the main clutching mechanism, such as a cone clutch resulting in light weight and simple construction. In addition, the invention eliminates the need for more complicated means for activating the ball ramp, such as a gear motor or levers.

Accordingly, the invention is directed to a drive having high speed and low speed modes of operation comprising an input shaft, a planetary gear set drivingly connected to the input shaft comprising a sun gear disposed about the shaft, a plurality of planet gears disposed about the sun gear and a ring gear disposed about and engaging the planet gears, and means for preventing the ring gear from rotating during the low speed mode, and an output pulley linked to and rotatable with the planet carrier. The drive further includes clutch means for connecting the output pulley to the input shaft during the high speed mode and for disengaging the output pulley from the input shaft during the low speed mode, and means including a bellows for moving the clutch means into and out from engagement during the high and low speed modes.

Many other objects and purposes of the invention will become clear from the detailed description of the drawings.

DETAILED DESCRIPTION OF THE DRAWINGS

Figure 1:
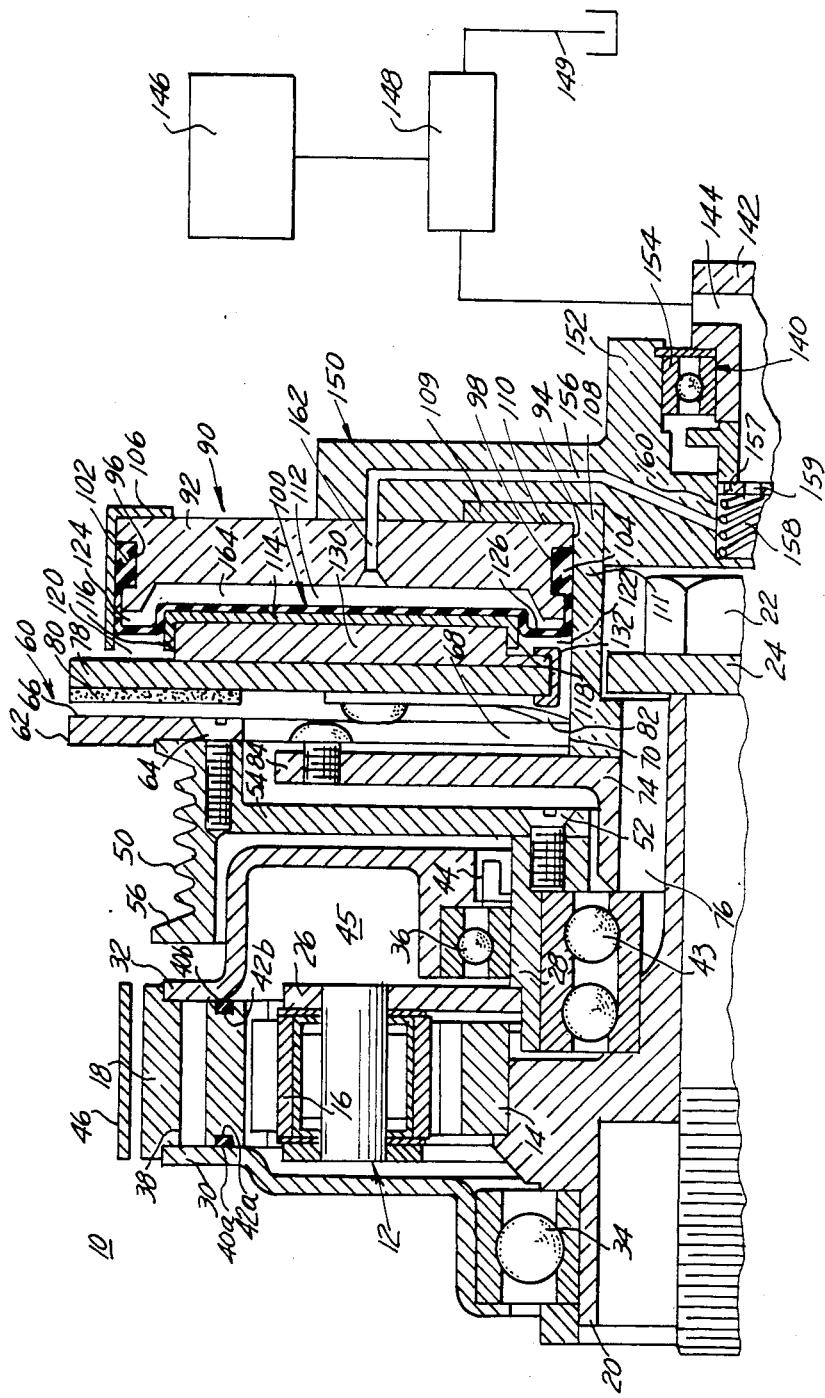
FIG. 1 represents a cross-sectional view of a preferred embodiment of the invention.

Reference is now made to the accompanying figures which illustrate a two speed accessory drive generally designated as 10. The drive incorporates a speed reducing planetary gear set generally indicated as 12 comprising a sun gear 14, a plurality of planet gears 16 positioned in surrounding relationship relative to the sun gear and a ring gear 18 positioned in driving relation about the planet gears. FIG. 1 illustrates but one of the planetary gears 16, such construction being known to one familiar in the art. The sun gear 14 is mounted to and rotates with an input member or shaft 20 which, as illustrated in FIG. 1, supports a number of the other components of the drive 10. The shaft 20 is connected to a rotating member of the engine, such as its crank shaft (not shown) by means of a bolt 22 and associated washer 24. The planet gears 16 are connected to a planet carrier 26 which is connected to an axially extending hub 28 concentric to the shaft 20. The ring gear 18 is positioned by housing members 30 and 32 which are isolated from the input shaft 20 and the axially extending hub 28 by bearings 34 and 36. The housing members 30 and 32 are joined to the ring gear by a fastener 38. A plurality of O-rings 40a and 40b are received in respective annular grooves 42a and 42b fabricated within the ring gear 18 and function to seal a lubrication cavity 45 defined by housing members 30 and 32. The housing members 30 and 32 define the lubrication cavity 45 for oil or the like. A seal 44 is provided to seal the cavity 45. The drive 10 further includes means, spaced from the ring gear 18, such as a band brake 46 for selectively prohibiting the ring gear 18 from rotating. The band brake 46 may be of the self-activating variety or, alternatively, controlled by a cooperating solenoid, as more fully disclosed in the commonly assigned patent application, U.S. Ser. No. 771,381, entitled "Multi-Speed Accessory Drive". The need for such band brake 46 will be apparent from the discussion below.

The planet carrier 26 extends radially downward from the planet gears 16 and is attached to the hub 28 which is rotationally supported relative to the input member by the bearing 43, such as a double-race bearing. The hub 28 supports an output pulley generally designated as 50 which may be attached thereto by fasteners, such as screws 52. The output pulley comprises a radial extension 54 extending outwardly from the hub 28. The radial extension 54 terminates at a pulley face 56.

The drive 10 further includes a flat plate clutch generally designated as 60. The clutch 60 includes a first plate 62 which is secured to the output pulley by means of fasteners 64. The outer portion of the first plate 62 defines an engagement surface 66. The inner portion 68 of the first plate 62 includes an opening 70, concentric to the input shaft 20, the purpose of which will be apparent below.

The second plate 78 is drivingly connected to the input shaft 20 by means of leaf springs 82 and a drive link 74 which is connected to the input shaft by means, such as a key 76.

The second plate 78 supports thereon an annular ring of friction material 80 for engagement with the engagement surface 66. The first plate 62 is drivingly connected to the input shaft when surfaces 66 and 80 are in contact. A plurality of leaf springs 82 are connected between the drive link 74 and the second plate 78, such configuration of leaf springs being discussed in greater detail in the above-identified patent application, which is herein incorporated by reference.

The second plate 78 is attached to the plurality of leaf springs 82 and drive link 74 by a plurality of fasteners 84.

The drive 10 further includes a bellows assembly generally designated as 90. The bellows assembly comprises an annular base plate 92 including an opening 94 therein. Proximate the outer radial edge of the base plate 92 and the inner edge of the opening 94 are annular grooves 96 and 98. Positioned within the grooves and extending axially therefrom is a toroidal or rolling diaphragm generally designated as 100. The diaphragm 100 includes lip portions 102 and 104 which are received within respective grooves 96 and 98. The diaphragm 100 is secured to the base plate 92 at the radial edge thereof by an annular cap 106. The base plate 92 is fixed to the input shaft by means of a sleeve 108 which extends through the opening 94. The sleeve 108 includes a radially extending flange 109 which is attached to an inner portion 110 of the base plate 92 and another end 111 driven through the key 76. The sleeve 108 further functions as a means for securing the lip portion 104 of the diaphragm 100 to the base plate 92.

The diaphragm 100 further includes a middle portion 112 against which is positioned a cup-shaped piston 114 having ends 116 and 118. The end 116, in cooperation with the cap 106, defines a first annular space 120 while the other end 118, in cooperation with the sleeve 108, defines a second annular space 122. The ends 124 and 126 of the rolling diaphragm 100 are received within the spaces 120 and 122, respectively, and move therein as the diaphragm and piston are moved axially.

Received within the cup-shaped piston 114 is a piston holder 130 which is secured to the second clutch plate 78 by means of an annular cap lock 132. Alternatively, the piston holder 130 may be attached to the second plate 78, such as by welding or fabrication as an integral extension thereof.

The bellows assembly further includes a rotating coupling generally designated as 140. The coupling includes a first portion 142 which may be attached to a non-rotating portion of the vehicle in a known manner. The first portion 142 includes a passage 144 which is attached to a source of pressurized fluid 146. Such fluid may be hydraulic or pneumatic, as the specific application of the drive dictates. A controller 148 permits fluid to be communicated to passage 144, thereby actuating the diaphragm, causing the first and second clutch plates to engage or, alternatively, permits fluid to be vented to drain 149, thereby permitting the clutch plates to disengage. The rotating coupling 140 includes a second portion 150 attached to and rotatable with the base plate 92. The first portion 142 is isolated from the second portion 150, i.e. from an axial extension 152 thereof by a bearing 154. The second portion 150 includes a passage 156 therein in communication with passage 144. The second portion 150 includes a valve 157, having an opening 159, that is biased against the first portion 142 by means of a spring 158, which is received within a cavity 160 thereof. Extending from the cavity 160 is the fluid passage 156 connected in communication to the passage 144 by virtue of its connection through the cavity 160. The passage 156 is connected to a passage 162 in the base plate 92 which terminates in a fluid receiving chamber 164 defined between the diaphragm 100 and the base plate 92.

In operation, the drive 10 includes two operating modes, a low speed or disengaged mode characterized by the clutch 60 being disengaged, and a high speed or engaged mode wherein the clutch 60 is engaged. FIG. 1 illustrates the drive 10 in its low speed or disengaged mode. In this mode of operation, the output pulley 50 is driven through the planetary gear set 12 and the planet carrier 26. In this situation the ring gear 18 will have a tendency to rotate in the direction opposite to that of the shaft 20. This counter-rotation is prevented by activation of the band brake 46 thereby holding the ring gear 18 stationary which in turn allows the pulley 50 to rotate at a reduced speed relative to the input shaft 20. Further, during this mode of operation, the controller 148 permits the venting of fluid from the chamber 164 to drain 149. The diaphragm 100, piston 114, piston holder 130 and the second clutch plate 78 are caused to move axially outward by operation of the leaf springs 82, thereby reducing the volume of chamber 164 which, in turn, urges the fluid therein out through the controller 148.

When it is desired to rotate the output pulley at shaft speed, the bellows assembly 90 is actuated by permitting pressurized fluid to flow through the rotating coupling 140 into the chamber 164 which results in the expansion of the diaphragm 100 in an axial direction. The expanding diaphragm exerts force on the piston 114 and piston holder 130, thereby urging the second plate 78 and more specifically the friction material 80 thereon into engagement with the first plate 62. Further, during this mode operation, the band brake 46 is caused to retract from the ring gear 18, leaving it free to rotate. In this high speed mode operation, the planetary gear set, the various plates of the clutch 60, and various members of the diaphragm assembly are permitted to rotate at the speed of the input shaft.

Figure 2:
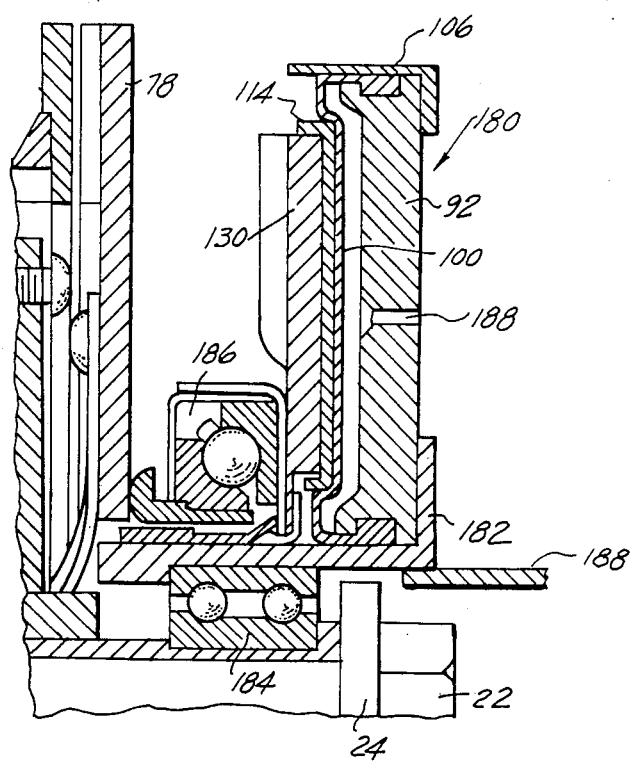
FIG. 2 illustrates an alternate embodiment of the invention.

As can be seen from the above, during either the high speed mode of operation or the low speed operation, the bellows assembly will rotate. Reference is briefly made to FIG. 2 which illustrates an alternate embodiment of the invention. This embodiment of the invention illustrates an alternate bellows assembly 180 which includes, as before, the back plate 92, diaphragm 100, end cap 106, piston 114, and piston holder 130. The diaphragm assembly 180 is supported on a sleeve 182 which is similar to sleeve 108 and which is isolated from the input shaft by a bearing 184. Supported on the bearing between the second clutch plate 78 and the piston holder 130 is a thrust bearing 186. In this embodiment of the invention, the diaphragm assembly, including the sleeve 182 and the thrust bearing 186, are attached to a non-rotating portion of the vehicle by a bracket schematically shown as 188. Pressurized fuel is communicated to the bellows assembly 180 through a passage 188 in a manner similar to that previously discussed. Upon activation of the bellows assembly, the diaphragm 100 will urge the thrust bearing 186, which is attached to the piston holder 130, to move axially, thereby engaging or disengaging the plates 62 and 78 of the clutch to achieve the high and low speed modes of operation.

Many changes and modifications in the above-described embodiment of the invention can of course be carried out without departing from the scope thereof. Accordingly, that scope is intended to be limited only by the scope of the appended claims.

What is claimed is:

1. A drive having high speed and low speed modes of operation comprising:
   an input shaft;

a planetary gear set drivingly connected to said input shaft comprising a sun gear disposed about said input shaft;

a plurality of planet gears disposed about said sun gear and a ring gear disposed about and engaging said planet gears;

means for preventing said ring gear from rotating during said low speed mode;

an output pulley linked to and rotatable with said planetary gear set;

clutch means for connecting said output pulley to said input shaft during the high speed mode and for disengaging said output pulley from said input shaft during the low speed mode;

bellows means for moving said clutch means into and out from engagement during the high and low speed modes, wherein said bellows means comprises:

an annular base plate rotatable with said input shaft and adapted to receive and vent pressurized fluid including an opening therein;

a diaphragm attached to said base plate, defining an expandable fluid chamber therebetween;

an annular piston supported by said clutch means and disposed about said input shaft proximate a middle portion of said diaphragm and axially movable relative to said base plate with said clutch means in correspondence with the volume of said fluid chamber, and engageably connected to said clutch means for moving same into engagement; and a sleeve received within the opening in said base plate including a first end attached to said base plate and a second end drivingly connected to said input shaft.

2. The device as defined in claim 1 wherein said base plate includes an annular first groove about said opening for receiving a first lip portion of said diaphragm therein, and wherein said sleeve secures said first lip portion within said first groove to provide a fluid tight seal thereabout.

3. The device as defined in claim 4 wherein said bellows means further includes a cap secured to a radial edge of said base plate in surrounding relation to an annular second groove for securing therein a second lip portion of said diaphragm.

4. A drive having high speed and low speed modes of operation comprising:

an input shaft;

a planetary gear set drivingly connected to said input shaft comprising a sun gear disposed about said input shaft;

a plurality of planet gears disposed about said sun gear and a ring gear disposed about and engaging said planet gears;

means for preventing said ring gear from rotating during said low speed mode;

an output pulley linked to and rotatable with said planetary gear set;

clutch means for connecting said output pulley to said input shaft during the high speed mode and for disengaging said output pulley from said input shaft during the low speed mode;

bellows means for moving said clutch means into and out from engagement during the high and low speed modes, wherein said bellows means comprises:

an annular base plate rotatable with said input shaft and adapted to receive and vent pressurized fluid including an opening therein;

a diaphragm attached to said base plate, defining an expandable fluid chamber therebetween;

an annular piston supported by said clutch means and disposed about said input shaft proximate a middle portion of said diaphragm and axially movable relative to said base plate with said clutch means in correspondence with the volume of said fluid chamber, and engageably connected to said clutch means for moving same into engagement, wherein said piston is cup-shaped and wherein said clutch means comprises a plate which includes an annular piston holder disposed about said input shaft for centering said piston relative to said input shaft and to said diaphragm.

5. The device as defined in claim 4 wherein said piston loosely engages said diaphragm.

6. A drive having high speed and low speed modes of operation comprising:

an input shaft;

a planetary gear set drivingly connected to said input shaft comprising a sun gear disposed about said input shaft;

a plurality of planet gears disposed about said sun gear and a ring gear disposed about and engaging said planet gears;

means for preventing said ring gear from rotating during said low speed mode;

an output pulley linked to and rotatable with said planetary gear set;

clutch means for connecting said output pulley to said input shaft during the high speed mode and for disengaging said output pulley from said input shaft during the low speed mode;

bellows means for moving said clutch means into and out from engagement during the high and low speed modes, wherein said bellows means comprises:

an annular base plate adapted to receive and vent pressurized fluid including an opening therein, means for isolating said base plate from said input shaft;

a toroidal diaphragm attached to said base plate, defining an expandable fluid chamber therebetween;

an annular piston disposed about said input shaft proximate a middle portion of said diaphragm and axially movable relative to said base plate in correspondence with the volume of said fluid chamber, and engageably connected to said clutch means for moving same into engagement, and wherein said isolation means comprises:

a sleeve received through said central opening and isolated from said input shaft by a bearing.

7. The device as defined in claim 6 wherein said bellows means further includes a thrust bearing slidably disposed on said sleeve and movable with said piston for causing the engagement of said clutch means.

8. The device as defined in claim 7 wherein said piston is cup-shaped and wherein said bellows means further includes an annular piston holder disposed about said input shaft, and connected to said thrust bearing for centering said piston relative to said input shaft and to said diaphragm and for urging said thrust bearing into engagement with said clutch means.

* * * * *